Figure 1:
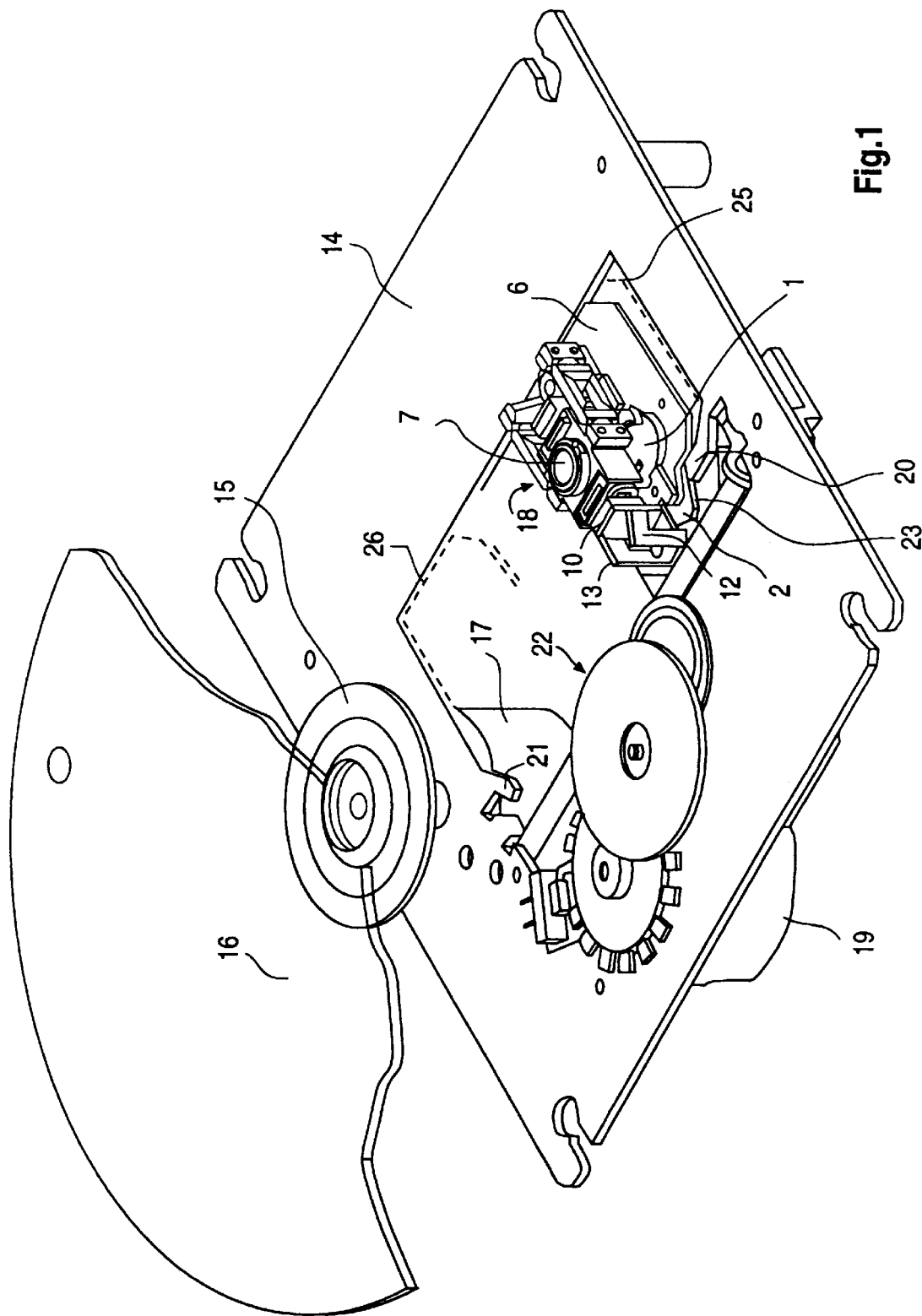

United States Patent

Schroeder et al.

[11] Patent Number: 5,940,359
[45] Date of Patent: Aug. 17, 1999

[54] OPTICAL DISK APPARATUS WITH MEANS TO SELECTABLY INSERT ADDITIONAL OPTICAL ELEMENTS IN AN OPTICAL BEAMS PATH

[75] Inventors: Heinz-Joerg Schroeder, Villingen-Schwenningen; Dietmar Uhde, Königsfeld; Fritz Weisser, St. Georgen, all of Germany

[73] Assignee: Deutsche Thomson-Brandt GmbH, Villingen-Schwenningen, Germany

[21] Appl. No.: 08/826,071

[22] Filed: Mar. 24, 1997

[30] Foreign Application Priority Data

Mar. 26, 1996 [DE] Germany .................. 196 11 904

[51] Int. Cl.$^6$ ........................................ G11B 7/00
[52] U.S. Cl. .................. 369/112; 369/44.23; 369/118
[58] Field of Search .................. 369/112, 94, 58, 369/44.23, 44.24, 118, 119, 110, 109

[56] References Cited

U.S. PATENT DOCUMENTS

| | | | |
|---|---|---|---|
| 4,059,841 | 11/1977 | Bricot et al. | 358/128 |
| 5,097,464 | 3/1992 | Nishiuchi et al. | 369/112 |
| 5,148,421 | 9/1992 | Satoh et al. | 369/44.23 |
| 5,235,581 | 8/1993 | Miyagawa et al. | 369/44.12 |
| 5,281,797 | 1/1994 | Tatsuno et al. | 369/118 |
| 5,497,366 | 3/1996 | Fujisawa | 369/112 |
| 5,699,341 | 12/1997 | Ssugi et al. | 369/118 |
| 5,717,674 | 2/1998 | Mori et al. | 369/103 |
| 5,754,513 | 5/1998 | Yagi et al. | 369/58 |
| 5,757,742 | 5/1998 | Akiba et al. | 369/44.23 |

FOREIGN PATENT DOCUMENTS 3706726  9/1987  Germany .

OTHER PUBLICATIONS

Neues aus der Technik, Vogel Verlag, Wurzburg, Nr. 3, Sep. 15, 1989, S.1.

*Primary Examiner*—Nabil Hindi
*Attorney, Agent, or Firm*—Joseph S. Tripoli; Eric P. Herrmann

[57] ABSTRACT

Apparatus for interposing additional optical elements in the optical path of an optical read/write device includes said additional element mounted on a carrier pivotally mounted on a lens carrier which is subject to lateral translation. Stops on the carrier to which the additional element is mounted engage actuators arranged at the limits of lateral travel of the lens carrier, which limits are beyond the recordable areas of the recording medium. The engagement of the actuators with the carrier causes the carrier to pivot and either insert or remove the additional optical element in the optical path of the apparatus. Magnetic retainers are included to prevent the additional element from moving from the desired position.

6 Claims, 3 Drawing Sheets

OPTICAL DISK APPARATUS WITH MEANS TO SELECTABLY INSERT ADDITIONAL OPTICAL ELEMENTS IN AN OPTICAL BEAMS PATH

The present invention relates to a device for reading from and/or writing to optical recording media which has an additional optical element which can be introduced into the beam path.

A device of this type is disclosed, for example, in U.S. Pat. No. 5,148,421. This device is suitable for reading from and/or writing to optical recording media whose recording layer is provided with protective layers having different thicknesses. In order to match the device to the different optical recording media, an optical disc is introduced into the beam path of the light beam which scans the optical recording medium. For this purpose, use is made of a displacement means, which, in response to a signal from a sensor which establishes the type of optical recording medium, introduces the optical disc or removes it from the beam path.

It may be regarded as disadvantageous in the case of the known device that the displacement means must actively move the optical disc into the beam path or out of the latter as a function of the signal emitted by the sensor. This necessitates an active electrical component, for example an electric motor. The latter requires a corresponding physical space, electrical supply leads, which must, if appropriate, be of elastic design, in order to be adapted to relative displacements between the sensor and displacement means, if appropriate a gear mechanism and a transmission train are required. Furthermore, an active electrical component produces waste heat and consumes energy. For reasons of convenience, it is necessary that it be possible to change rapidly between the introduced position and the removed position of the optical disc, which necessitates a powerful drive. Since, however, a change of this type generally occurs only very rarely, the displacement means constitutes a component which is required only rarely yet demands a high outlay. In general, it is assumed that the type of optical recording media which is optimally suited to the device is used and only in exceptional cases an optical recording medium which requires the introduction or removal of the optical disc.

The object of the present invention, therefore, is to provide a simple, cost-effective, compact yet reliable device for reading from and/or writing to optical recording media which has an additional optical element which can be introduced into the beam path.

The invention provides that the displacement means is formed by a mechanical actuating element. This has the advantage that the displacement means is or are easy to realize, and that they do not have a large space requirement. A mechanical stop subjected to compressive load or one subjected to tensile load, but also other stops, for example a stop realized by means of magnetic repulsion or attraction, may advantageously be used as passive elements. These passive components furthermore have the advantage that a dedicated drive, such as an electric motor or solenoids, is not necessary. The inventive device for reading from and/or writing to optical recording media can thus be matched in a simple manner to optical recording media having protective layers of different thicknesses, which protective layers cover the recording layer. However, the additional optical element can also be introduced for reasons other than thickness matching. In general terms, it is used for matching the device and optical recording medium to one another with regard to the respective optical properties. The additional element may be, for example, a plane-parallel disc, a lens, a filter, a holographic element or another suitable optical element.

If the focusing means are arranged displaceably relative to the optical recording medium between two end positions, then the actuating elements are advantageously arranged in these end positions. Since the focusing means can generally be moved, by means of a coarse drive, in the radial direction relative to the optical recording medium, the actuating elements according to the invention can be arranged in the end positions of the said focusing means without a relatively high outlay. Even devices which have already been fabricated can thus be retrofitted with the actuating elements according to the invention without a relatively high outlay and, consequently, can be converted cost-effectively to operation with different types of optical recording media. A further advantage of this refinement is that a coarse drive, which is present in any case, of the device can additionally be used to displace the additional optical element without the necessity of structurally adapting the coarse-drive motor to its new task.

The invention furthermore provides for arranging the additional optical element on a carrier element, which, for its part, has stop elements. An advantage of this solution is that the stop elements can be designed independently of the additional optical element and can thus be matched to the conditions of the device. The carrier element furthermore serves for the exact mounting and guidance of the additional optical element.

The carrier element can advantageously be mounted such that it is linearly displaceable, but a particularly uncomplicated refinement of the present invention consists in the carrier element being mounted such that it is rotatable. In this case, the carrier element is fastened to a pivot and forms a lever arm which can be pivoted about the axis of rotation and on which the additional optical element is arranged. The additional optical element is advantageously arranged on the outer end of the lever arm, which permits a relatively high degree of displacement with a small pivoting angle. The stop elements are likewise arranged here in such a way that they make optimum use of the leverage: They can be arranged closer towards the axis of rotation or further away from the axis of rotation, depending on the possible force which can be expended. A particularly compact refinement of the carrier element is attained when the stop element and additional optical element are arranged on the same side of the axis of rotation. However, it is equally possible to arrange the stop element on that side of the axis of rotation which faces away from the additional optical element if this appears to be practical for design reasons.

According to a further aspect of the present invention, it is provided that the carrier element has holding elements for holding the additional optical element in the introduced or removed position. This affords the advantage that the additional optical element is reliably fixed in the respective position, which increases the operational reliability, in particular in the event of possible vibrations of the device or of parts of the device. Provision is made here for fastening the holding elements, for example by means of latching connections, on components which are stationary with regard to the displacement movement of the additional optical element.

The advantage of especially good utilization of components which are present in any case in the device is achieved by virtue of the fact that the holding elements interact with one or more magnets assigned to the focusing means. This magnet is advantageously the permanent magnet which is present for the focusing or for the vernier drive of an objective lens and on which the holding elements, which are provided with magnets or consist of a magnetic metal, are held with uniform force. The holding elements can be released only once a minimum force has been overcome, which virtually precludes unintentional release, for example due to vibrations. The magnet may alternatively be an electromagnet, whose strength can be cancelled in order to release the holding elements.

A further solution according to the invention consists in arranging the magnets exclusively on the holding element and allowing them to interact with corresponding stationary counterparts, magnetic metals or electromagnets. This affords the advantage that the strength of these magnets can be matched to the mass, to be held, of the carrier element and additional element. It is consequently possible to avoid dimensioning the holding force such that it is excessive or too little, without making structural changes to the focusing means.

A further aspect of the present invention consists in providing control means, which control the introduction or removal of the additional optical element into or from the beam path. It is particularly favourable here to leave the additional optical element outside the beam path in the normal case and introduce it only when it is necessary, for example when a corresponding optical recording medium is detected or a manual specification from the user requires it. This can be ensured by virtue of the fact that the coarse drive is moved into the corresponding position after the switching-on operation or before the switching-off operation, and after the insertion of a new optical recording medium. Such automatic setting of a standard position can advantageously be carried out whenever there is a pause in the read-out or writing operation in any case, with the result that the user is not aware of any time loss. Moreover, monitoring the setting relatively frequently may, if appropriate, render holding elements superfluous or limit their required holding strength.

Figure 2:
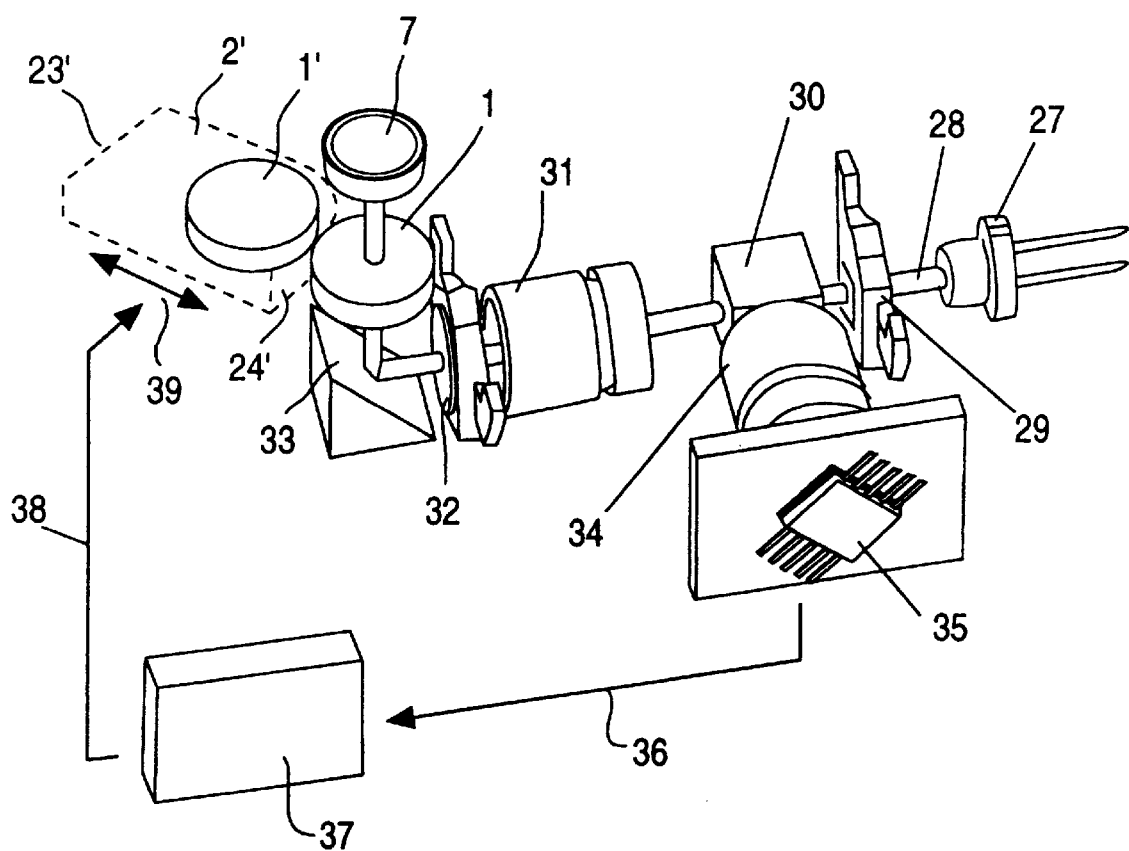
Figure 3:
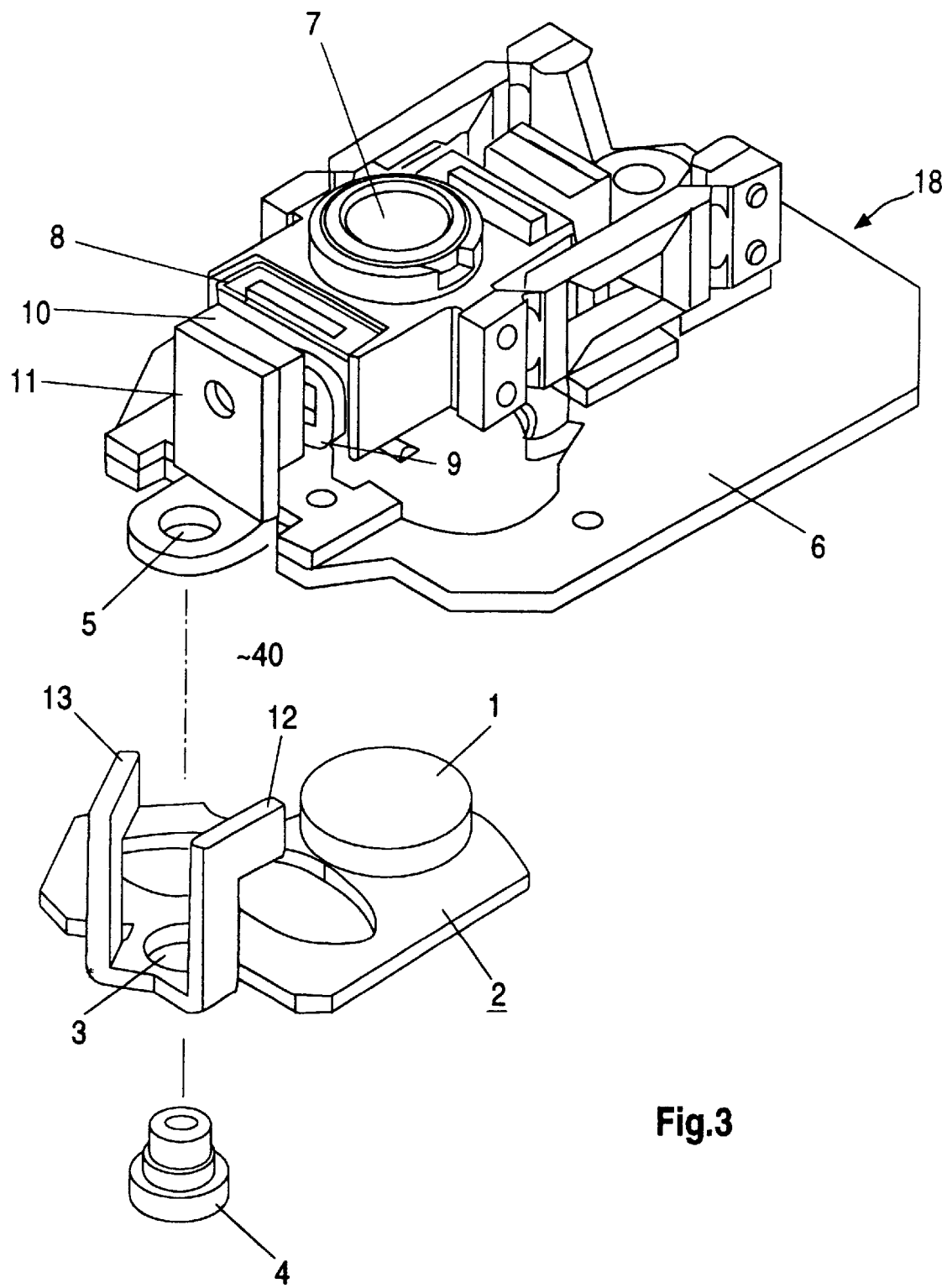

It goes without saying that the individual measures specified constitute advantageous refinements of the invention even in combination with one another. At the same time, the inventive concept is not restricted to the cited exemplary embodiments, but also extends to simple developments, familiar to a person skilled in the art, of the inventions described. Further advantages are described in the following exemplary embodiment. In the figures:

FIG. 1 shows a three-dimensional view of a device according to the invention, with a drive unit and a read-out/writing unit FIG. 2 shows a diagrammatic three-dimensional view of a read-out/writing unit of a device according to the invention FIG. 3 shows an exploded illustration of the focusing means with a displacement means according to the invention for an additional optical element FIG. 1 shows a three-dimensional view of a device according to the invention. A turntable 15 is arranged on a mounting plate 40 and serves to receive an optical recording medium 16, which is represented only partially in this case. The turntable 15 is driven by a drive unit 17. Focusing means 18 are fitted such that they are linearly displaceable with regard to the mounting plate 14; a linear displacement of the focusing means 18 corresponds to a radial movement with regard to the optical recording medium 16. A coarse-drive motor 19 serves to drive the focusing means 18. A gear mechanism 22, which has gearwheels and toothed and/or threaded racks, is provided for force transmission to the focusing means 18.

The focusing means 18 have an actuator plate 6, on which, inter alia, an objective lens 7 and an additional optical element 1 are arranged. The additional optical element 1 is mounted such that it can be pivoted by means of a carrier element 2 designed as a lever. The position of the additional optical element 1 in which it is removed from the beam path is illustrated. In order to displace the additional optical element 1 into the other position introduced into the beam path, use is made of the stop edge 23 of the carrier element 2, which stop edge interacts with a lug 20, which acts as an actuating element, of the mounting plate 14 when the focusing means 18 is displaced beyond the position illustrated in FIG. 1 into its radially outermost (with regard to the optical recording medium 16) end position 25 indicated by dashed lines. In the process, the carrier element 2 swivels about its axis of rotation in such a way that the additional optical element 1 is situated in the beam path.

If the actuator plate 6 is displaced into its radially inner (with regard to the optical recording medium 16) end position 26, which is likewise indicated by dashed lines here, then a stop edge 24 (not illustrated here) of the carrier element 2 interacts with the lug 21 of the mounting plate 14 in order to displace the additional optical element 1 out of the beam path. The end positions 25 and 26 in this case lie respectively outside and inside the radially outer and radially inner end and starting positions, respectively, which are suitable for reading out the information present on the optical recording medium 16. The end positions 25 and 26 are therefore moved to only in order to pivot the additional optical element 1 into the beam path or out of the latter. In order to fix the additional optical element 1 in its respective desired position, holding elements designed as tabs 12 and 13 are arranged on the carrier element 2 and interact with a magnet 10.

FIG. 2 shows a diagrammatic three-dimensional view of a read-out/writing unit of a device according to the invention. A laser diode 27, which produces a laser beam 28, is used as light source. The said laser beam passes through an optical grating 29, a beam splitter 30, a collimator lens 31 and a quarter-wave or $\lambda/4$ plate 32, is deflected by a mirror 33 and passes through the additional optical element 1 as well as the objective lens 7, which focuses the said beam onto the information layer of the optical recording medium 16. The laser beam 28 is reflected back from there and passes through the said components in the reverse direction until it is deflected by the beam splitter 30 and, after passing through an optical arrangement 34, falls onto the detector 35. The latter comprises, in a known manner, a plurality of detector zones whose output signals 36 are conducted directly or already preprocessed, for example amplified, to a control unit 37. In addition to other control signals, the said control unit also emits control signals 38 for displacing the additional optical element 1, which is a lens in the exemplary embodiment. The additional optical element 1' is illustrated by dot-dashed lines in its position removed from the optical beam path. A carrier element 2' which can be linearly displaced in the direction of the arrow 39 is represented here by dashed lines as an alternative to the carrier element 2 designed as a lever in FIG. 1. The said carrier element 2' also has stop edges 23', 24' which are used, together with corresponding actuating elements (not illustrated here) of the mounting plate, for inserting or removing the additional optical element 1 into or from the beam path.

FIG. 3 shows an exploded illustration of the focusing means 18. The additional optical element 1 is fastened on the carrier element 2, which is designed as a lever and has a hole 3 on which a bush 4 is mounted. The bush 4 is fastened together with the carrier element 2 in a hole 5 in the actuator plate 6. It is possible in a particularly cost-effective manner to embody this connection as a riveted connection. Situated on the actuator plate 6 is the objective lens 7, which is controlled by means of a focus coil 8, a tracking coil 9, which serves as vernier drive, and the magnet 10 with its return path laminates 11. Two tabs 12, 13 are provided on the carrier element 2, which tabs form the holding elements and reliably fix the carrier element 2 in the respective position in the respective stop position on the magnet 10. In order to displace the carrier element 2 into the respective other position, it is first necessary to overcome the holding force between the tab 12 or 13 and the magnet 10.

In order to be able to store digital video signals on optical recording media, the audio CD standard was further developed to give the DVD (Digital VideoDisk). In contrast to the conventional CD, in which the information carrier layer is at a distance of the disc thickness of 1.2 mm from the surface, the information carrier layer in the DVD is at a distance of 0.6 mm from the surface. Optical recording media which can be prerecorded on two sides are possible in this way. In a DVD playback device, it should be possible to play back a normal CD as well as the DVD. There is then a difficulty in focusing the laser beam 28 onto the information carrier layer, which is offset by 0.6 mm. It is therefore provided, for playing back a CD, to introduce an additional optical element 1, a lens in the exemplary embodiment, into the beam path in order to match the optical system, which is matched to recording media in the DVD format, of the read-out/writing unit, to the altered layer thickness and recording capacity of the CD. In FIG. 1, the additional optical element 1 is pivoted out and the device is ready for playing and/or recording on an optical recording medium 16 in the DVD format. If an optical recording medium in the CD format is now inserted, the laser beam 28 cannot be focused onto the information carrier layer. In this case, the focusing means 18 move beyond the outermost position suitable for reading out and/or recording, which position is illustrated in FIG. 1, into the end position 25. The additional optical element 1 is pivoted in by means of the lug 20 of the mounting plate 14. After the playback of the CD, after the removal of the CD from the device or at other suitable points in time, the focusing means 18 move beyond the innermost position suitable for reading out and/or recording into the radially inner end position 26, in which case the lug 21 strikes against the stop edge 24 of the carrier element 2, the latter swivels about its axis of rotation 40 and thus pivots the additional optical element 1 out of the beam path.

The invention proposes a simple, cost-effective yet reliable device for reading from and/or writing to optical recording media 16 which has an additional optical element 1 which can be introduced into the beam path or removed from the latter. Mechanical stop elements 20 and 21, which interact with corresponding stop edges 23 and 24, respectively, of a carrier element 2 which carries the additional optical element 1, are provided for this purpose. The area of application of the invention includes devices which are suitable for reading from and/or writing to optical recording media having different structures, such as digital videodisks (DVD) and conventional audio CDs (CD).

We claim:

1. Device for reading from or writing to optical recording media, having a light source for producing a beam for reading out or writing to the optical recording medium, comprising:

a lens carrier including at least one magnet and a focusing lens, for directing the beam onto a recording layer of the optical recording medium, said lens carrier subject to lateral translation between two opposite limits outside of recordable areas of the recording media:

an additional optical element for matching optical properties of recording media and said device, arranged on a further carrier for selectable introduction in the path of said beam;

displacement means, formed by mechanical actuating elements, arranged at said opposite limits, for engaging said further carrier to introduce/remove said additional optical element into/from the path of said beam through the focusing lens; and magnetic holding elements included on said further carrier, for interaction with said at least one magnet, to retain said additional optical element in a desired state of being in or out of said path.

2. Device according to claim 1, characterized in that said further carrier has stop elements for engaging said displacement means.

3. Device according to claim 2, characterized in that the further carrier element is pivotally mounted on said lens carrier.

4. Device according to claim 1, characterized in that control means (37) are provided which control the introduction/removal of the additional optical element (1) into or from the beam path.

5. Device according to claim 4, characterized in that said control means controls displacement of said additional optical element (1) into or from the beam path.

6. Device according to claim 5, characterized in that said control means controls displacement of said additional optical element during;

a. energization of the device;
   b. de-energization of the device; and
   c. when a different recording medium is inserted in the device.

* * * * *